UNITED STATES PATENT OFFICE.

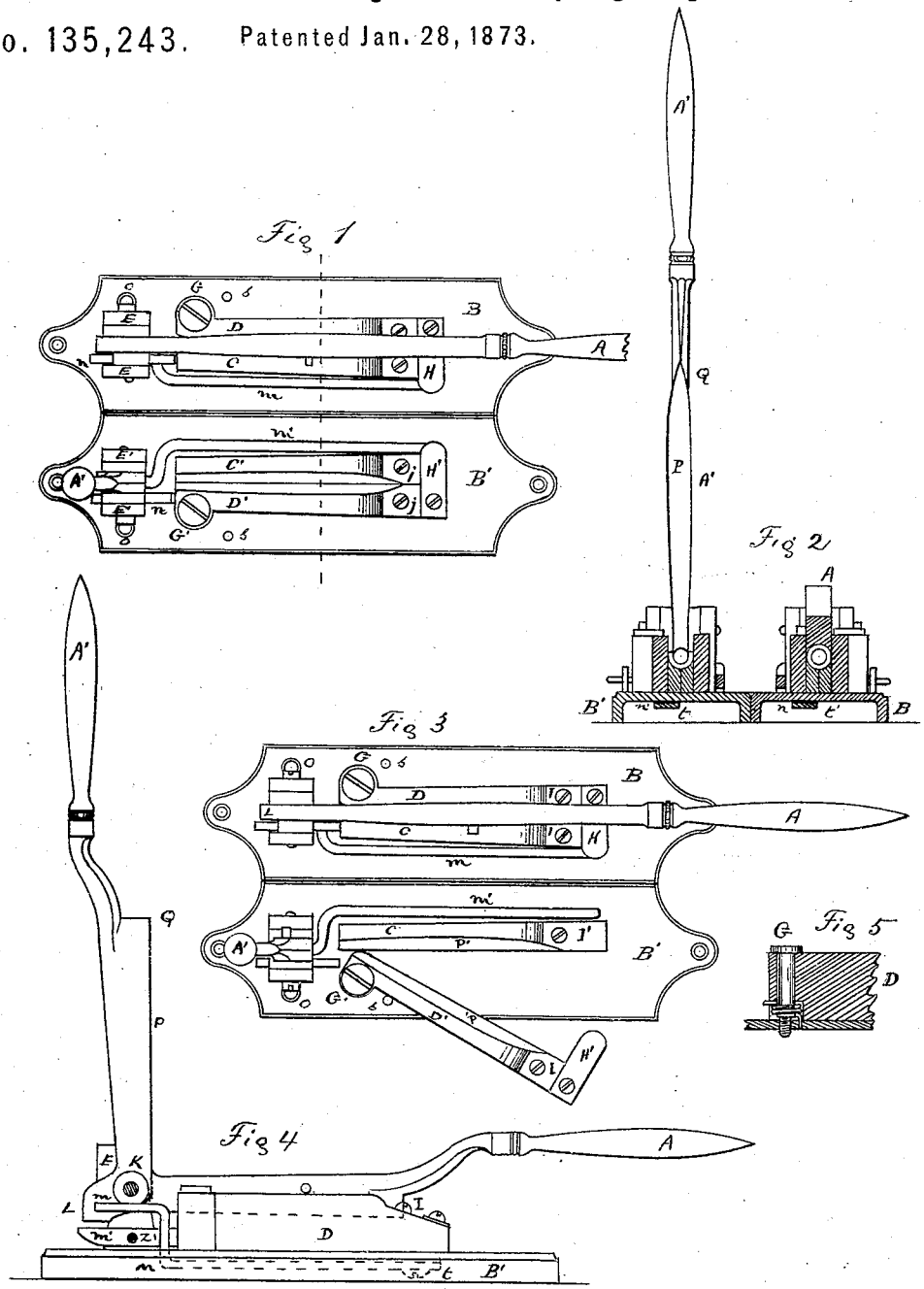

CHARLES H. PALMER, OF NEW YORK, N. Y.

IMPROVEMENT IN MACHINES FOR PRESSING AND SHAPING CIGAR-FILLERS.

Specification forming part of Letters Patent No. 135,243, dated January 28, 1873.

*To all whom it may concern:*

Be it known that I, CHARLES H. PALMER, of the city, county, and State of New York, have invented a new and useful Improvement in Machines for Pressing and Shaping the Fillers of Cigars and Cutting their Tips; and I do hereby declare that the following is a full, clear, and exact description and specification of the same, reference being had to the accompanying drawing making part of this specification.

The object of my invention is to expedite and cheapen the manufacture of cigars, and at the same time to furnish a machine for pressing, shaping, and cutting the tips of the fillers, which shall be substantial, durable, and capable of adjustment; and to this end my invention consists, first, in the combination of a bottom mold for pressing and shaping cigar-fillers, and a movable or adjustable tip-cutting die or dies for cutting the tips. This enables me to remove, renew, or adjust the cutting-die without making a new mold. Secondly, my invention consists in the bottom mold for pressing and shaping cigar-fillers (having cutting-edges for the tips) divided into two parts by a vertical plane passing longitudinally between them. By this construction I am enabled to shape the sides of the mold more perfectly and conveniently. Thirdly, my invention consists in a bottom mold for pressing and shaping cigar-fillers, divided into two parts by a vertical plane passing longitudinally through said mold, one or both parts being pivoted at one end, and provided with adjustable tip-cutting dies. This enables me to operate the mold more rapidly and to keep the dies in the proper position to cut the tips. Fourthly, my invention consists in a cigar-molding, pressing, and shaping, and tip-cutting lever-knife, provided with a bearing or stud at one end, on which it may vibrate in the arc of a circle, a hub flattened to fit a retaining-spring, and a lever projection to actuate a lever for disengaging the catch of the bottom mold. Fifthly, my invention consists in certain combinations of a bottom cigar-mold for pressing and shaping cigar-fillers with a lever-knife and other instrumentalities to open the mold, and hold the lever-knife in a vertical position while the operator is filling the said mold. These combinations are set forth specifically at the end of this specification.

In order that persons skilled in the art may be able to make and use my invention, I will proceed to describe the construction and operation of my machine, referring to the accompanying drawing, in which—

Figure 1 represents a top view of my machine in duplicate, the jaws D and D' of the bottom molds being constructed to swing on studs G and G', one to the right and the other to the left. The bed-plates B and B' are bolted together and firmly fastened to a table or platform. At one of the bed-plates two cheeks, E E, are raised, through each of which is a pin, O, forming a center for the end of the lever-knife. A and A' are the lever-knives, A being shown in a horizontal position, and A' standing vertically. They are provided with flattened hubs K K', Fig. 4, against which rest the retaining-springs $n$ $n'$. These springs serve to hold the lever-knives in an upright position, and also to throw them into this position after the projections L L' have pressed down the ends of the levers $m$ $m'$ sufficiently to cause the disengagement of the catches H H', which hold the parts of the bottom mold together. The levers $m$ $m'$ are pivoted at Z Z' and extend along between the molds under the ends of the catches H H', so that when the ends of the levers $m$ $m'$ are pressed downward by the projections L L', the other end under the catch rises and forces the catch up enough to allow the mold to open. The springs $n$ $n'$ are fastened under the bed-plates by screws $t$ $t'$. The bottom molds are made in two parts. One part is fastened to the bed-plate and the other is pivoted at G. On this pivot is a spiral spring, which tends to open the mold when the catch is released, (a stop, $s$, prevents the movable part from going too far.) This pivot with the spiral spring, is shown in Fig. 5. The parts of the mold are shaped to the form of a cigar, and have hardened steel dies, shown at I I', fastened to one end to cut the tip of the cigar-filler. They are held by screws, and the holes in the dies are elongated, so that when their cutting-edges become worn they may be adjusted or removed. The upper mold I call a lever-knife, and it is shown in Fig. 4, in side view. It is made in one piece, and the cigar-shape is cut out hollowing at P, and it is sharpened to a knife-edge at Q to cut the tip. It is provided with a projection, L, and hub K for the purpose of operating the lever *m* and resting on the spring *n*.

The operation of my machine is as follows: The workman having closed the mold the catch H holds the parts together. He then places sufficient tobacco in the mold to make a cigar-filler, allowing part to project over the cutting-dies I I'. The lever-knife is then brought down and cuts the tobacco at the tip, pressing all the remainder into the mold. He now raises the second lever-knife and fills the second mold, after which he brings down the lever-knife as in the first case, cutting and pressing the filler. The filler in the first die or mold is now ready to be taken out, which is done by raising the lever-knife until the projection L strikes the lever *m*, disengages the catch H and opens the mold, leaving the filler free to be removed. The spring *n* acting on the flattened part of the hub of the lever-knife causes the knife to take a vertical position, and to remain so until again brought down by the hand of the operator.

Having now described my improved machine, what I claim as my invention, and desire to secure by Letters Patent, is—

1. The combination, substantially as herein set forth, of a bottom mold for pressing and shaping cigar-fillers, and a movable or adjustable die or dies for cutting the tips.

2. A bottom mold for pressing and shaping cigar-fillers and cutting their tips, divided into two parts by a vertical plane passing longitudinally through between them.

3. A bottom mold for pressing and shaping cigar-fillers, divided into two parts by a vertical plane passing longitudinally through said mold, one or both parts being pivoted at one end and provided with adjustable tip-cutting dies.

4. A cigar-pressing, shaping, and tip-cutting lever-knife provided with a bearing or stud at one end, on which it may vibrate in the arc of a circle, a hub fitted to receive a retaining-spring and a lever projection to actuate a lever for disengaging the catch of the bottom mold.

5. The combination, substantially as herein set forth, of a bottom cigar-mold divided into two parts by a vertical plane passing longitudinally through said mold, provided with tip-cutting edges, and a lever-knife moving in the arc of a circle for pressing and shaping cigar-fillers, and provided with tip-cutting edges for cutting the tips of the same.

6. The combination, substantially as herein set forth, of a bottom cigar-mold divided into two parts, as hereinbefore described, a pressing, shaping, and tip-cutting lever-knife, a lever for disengaging the catch, and a catch for holding the parts of the mold together.

7. The combination, substantially as herein set forth, of a cigar-shaping, pressing, and tip-cutting mold, a lever-knife provided with a bearing or stud, on which it may vibrate in the arc of a circle, a hub flattened to fit a retaining-spring, and a retaining-spring.

CHARLES H. PALMER.

Witnesses:
   JOHN F. GARVEY,
   WM. C. HICKS.